US005563355A

United States Patent [19]
Pluta et al.

[11] Patent Number: 5,563,355
[45] Date of Patent: Oct. 8, 1996

[54] FORCE SENSOR

[75] Inventors: Richard J. Pluta; Clyde M. A. Ko, both of Grand Rapids, Mich.

[73] Assignee: CJ Design & Engineering, Inc., Grand Rapids, Mich.

[21] Appl. No.: 65,949

[22] Filed: May 24, 1993

[51] Int. Cl.$^6$ .................................................... G01L 1/00
[52] U.S. Cl. .................. 73/862.625; 74/512; 74/514; 303/3; 303/188
[58] Field of Search .................. 73/862.626, 862.625, 73/862.53, 745, 744, 865.9, 862.382, 862.46, 862.471, 862.472, 862.73; 74/514, 512; 303/3

[56] References Cited

U.S. PATENT DOCUMENTS

| | | |
|---|---|---|
| 3,802,745 | 4/1974 | Strifler et al. . |
| 3,827,758 | 8/1974 | Hansen . |
| 4,002,373 | 1/1977 | Mori . |
| 4,130,027 | 12/1978 | Leighton . |
| 4,279,162 | 7/1981 | Neill et al. . |
| 4,295,687 | 10/1981 | Becker et al. . |
| 4,297,550 | 10/1981 | Leighton . |
| 4,300,409 | 11/1981 | Leighton . |
| 4,327,414 | 4/1982 | Klein . |
| 4,370,714 | 1/1983 | Rettich et al. . |
| 4,404,439 | 9/1983 | Leighton . |
| 4,591,795 | 5/1986 | McCorkle ........................... 324/207.18 |
| 4,602,702 | 7/1986 | Ohta et al. . |
| 4,709,968 | 12/1987 | Tanaka et al. . |
| 4,818,036 | 4/1989 | Reinecke ..................................... 303/50 |
| 5,216,364 | 6/1993 | Ko et al. ............................... 340/870.31 |

*Primary Examiner*—Richard Chilcot
*Assistant Examiner*—Ronald Biegel
*Attorney, Agent, or Firm*—Varnum, Riddering, Schmidt & Howlett

[57] ABSTRACT

A force sensing device providing an output signal indicative of applied force includes a compressible spring, preferably a Belleville type spring, inserted between a force application lever and a reaction force member and the spring is compressed when a force is applied to the lever. In one embodiment, the reaction force member is a push rod and the spring is disposed in a housing attached to a pin on the force lever and the push rod is provided with a longitudinally extending slotted opening in the area of the force pin such that the spring is compressed when the force pin is moved in the elongated area of the push rod. In another embodiment, the spring is disposed in a housing having one end connected to the force lever and a reaction force push rod engages the housing in an opening at its other end and the spring is compressed against the push rod when a force is applied to the force lever. In another embodiment, one end of a push rod is connected to a pivoting force lever and the spring is disposed between the force lever pivot pin and a fixed member such that the spring is compressed when a force is applied to the force lever. A linear voltage differential transformer senses movement of the spring an output circuitry provides electrical signals indicative of the different levels of applied force.

14 Claims, 6 Drawing Sheets

PRIMARY

SECONDARY (+) OUT PUT

SECONDARY (−) OUT PUT

PHASE CORRECTOR

SAMPLING PULSE

PHASE CORRECTED WAVE

FORCE SENSOR

BACKGROUND OF THE INVENTION

1. Field of the Invention

The invention relates to force sensors and more particularly to force sensors employing an electrical coil and a movable core.

2. Description of Related Art

Force sensing devices are commonly used in many applications, particularly in automotive vehicles and a variety of subsystems such as brake, suspension, transmission, speed control and the like. Various force sensor are known. Some respond to pressure moving a wiper arm or the like on a potentiometer. Others use piezoelectric elements which generate an output signal representative of the magnitude of an applied force. Still other sensors use a movable core in a coil assembly which provides an output signal representative of the position of the core relative to the core assembly. A problem in prior art force sensors is to obtain output data or an output profile of the applied force which accurately represents the force applied, including minor force differences. A particular difficulty in force sensing is measuring the high forces exerted in these applications without adding travel or mass to a force pedal assembly. A particular problem is to detect the application of relatively small forces such as may be applied at the beginning of travel of a brake pedal or the like. The sensors preferably are rugged and of small physical dimensions to allow them to be used in small spaces and operating under a variety of conditions.

In typical automotive braking systems, the force applied to the brake pedal is transmitted through a master cylinder or the like to the braking system. It is desirable to obtain a measurement of the force applied to the master cylinder and generate an output signal indicative of that force which may be used in another system, such as an electric braking system for a trailer. Known pressure sensing devices which may be used in conjunction with hydraulic brake systems typically lack accuracy, particularly at the initial travel of a brake pedal or the like, often resulting in lost motion. Such lost motion results in a lack of sensitivity in the initial brake pedal travel distance, where touch sensitivity is most important.

A disadvantage of prior art pressure sensing devices which sense fluid pressure is that because of their location in the system, they necessarily respond relatively late in the braking process introducing undesirable delay in signal initiation and, correspondingly, in system response. Furthermore, the cumulative effect of preload springs, frictional forces and other mechanical elements often require the application of significant pedal forces before these sensors react. A further disadvantage of the pressure sensing devices is that they do not function in the event of hydraulic system failure.

Another problem of prior art sensing devices is that only a single output signal is available. For certain applications, such as an automotive braking system, the output of the force sensing device is used to initiate a variety of functions, such as cruise control release, transmission release, shift interlock and suspension control. These functions are preferably performed at levels of applied force. Cruise control release, for example, should occur in response to slight brake pressure and transmission-lock release should occur in response to substantial brake pressure. In existing systems, a single force sensing output signal is used for all purposes.

U.S. Pat. No. 4,818,036, entitled Braking Power Transmitter, discloses a braking power transmitter for use in a pneumatic braking system to produce control pressure for a brake cylinder. The device consists of a foot pedal acting against the force of a coil spring not directly linked to the braking system. An electronic sensing device produces an output signal. A rod, connected to the pedal and extending through the spring, is provided with a core at the distal end which extends into an electrical coil of a sensing device. The sensing device produces an output signal indicative of the position of the core relative to the coil, representing the force applied to the pedal against the spring. A disadvantage of this prior art arrangement, however, is that it does not measure force applied to a brake system, or the like, which provides a reaction force. A further disadvantage of the prior device is that it uses a coil spring which requires either a long stroke or large diameter to measure high forces, such as may be applied to a brake pedal, over short travel distances.

SUMMARY OF THE INVENTION

These and other problems of the prior art are overcome in accordance with this invention by means of sensing arrangement integrated in the pressure application system, such as an automotive braking system. In accordance with our invention, a force sensor comprises a compressible spring connected between a system's force application lever and the system's reactive force member, and a force applied to the system's application lever is transmitted from the force application lever to the reactive force member through the spring. A plunger pin, having one end engaging the spring and a free end disposed adjacent a coil assembly, is moved relative to the coil assembly as the spring is compressed and an output circuit connected to the coil assembly generates an output signal indicative of the force applied to the force application lever. In one particular embodiment of the invention, the reactive force member is a push rod and the spring is disposed within the housing attached to the lever arm, and one end of the spring abuts the push rod. In a further embodiment, the push rod is provided with a slotted opening and a force pin mounted on the force application lever is disposed in the slotted opening and engages one end of the slotted opening when the spring has been compressed to a predetermined distance such that force is transmitted directly from the lever to the push rod when the spring is compressed beyond the predetermined distance.

In a further embodiment of the invention, a spring retaining structure has one end connected to the lever arm and an opposite end provided with an opening engaging one end of a push rod. The push rod terminates within the housing and a spring is disposed between one end of the push rod and an end of the housing such that force is transmitted between the lever and the push rod through the spring and compression of the spring provides an indication of force applied to the push rod.

In another embodiment of the invention, the force application lever is pivotally supported on a pin disposed within a slotted opening in the support member and the spring is disposed between the support pin and one end of the slotted opening to exert a reactive force on the pin when a force is applied to the free end of the lever. The distance by which the spring is compressed when force is applied to the free end of the lever, provides an indication of the force applied to a push rod or the like connected to the lever since the magnitude of the force transmitted from the lever to the push rod is a function of the force applied by the spring against the movable support pin.

In accordance with one aspect of the invention, the compressible spring comprises a coned disk spring which may, for example, be of a type known as a Belleville spring. Advantageously, the use of a cone disk spring, such as the Belleville type spring, having variable spring characteristics, provides the ability to tailor the sensor output such that greater sensitivity to applied force may be obtained at various ranges of travel of the force pedal. Particularly, greater sensitivity at the initial travel of the force by a pedal is obtained by the use of a cone disk spring with selected spring characteristics.

In accordance with this invention, the extent of compression of the spring is measured by means of a transformer coil assembly having a primary coil and a secondary coil, both connected to an electrical circuit. The circuit comprises a signal generator transmitting a sinusoidal input signal to the transformer coil assembly, and an output circuit connected to the coil assembly generates an output signal indicative of the distance of compression of the spring and hence of the applied force.

In accordance with one aspect of the invention, the transformer coil assembly comprises a primary coil and a secondary coil generating a sinusoidal output signal and the output circuit comprises a peak detection circuit and a sampling circuit responsive to the peak detection circuit for sampling the sinusoidal output signal at the peaks of the sinusoidal output signal.

In one particular embodiment of the invention, the signal generator comprises an oscillator circuit including first and second amplifier circuits interconnected to provide a stable amplitude output signal.

In accordance with another aspect of the invention, an electrical output signal indicative of applied force is compared by means of one or more comparator circuits to predetermined signal levels to generate a plurality of output signal, each indicative of a different magnitude of applied force.

DETAILED DESCRIPTION

Figure 1:
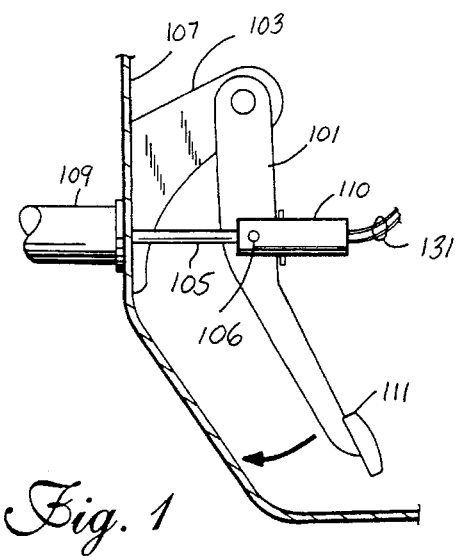
FIG. 1 is a diagrammatic representation of a brake pedal assembly with a force sensing device in accordance with the invention.

FIG. 1 is a schematic illustration of a brake actuating arrangement including a force application lever in the form of pedal arm 101, pivotably supported on a support bracket 103 which is mounted on the fire wall 107 of an automobile. A push rod 105 is connected to the pedal arm 101 and extends through the fire wall and into a master cylinder 109 of the vehicle's hydraulic brake system. A sensor 110 is mounted on the pedal arm 101. An electrical connection is established between a transformer coil assembly in sensor 110 and an electrical detection circuit (shown in FIGS. 7 and 8) via conductors 131. When a force is applied to the pedal arm 101 at a foot plate 111, a reactive force supplied by the push rod 105 is sensed at sensor 110.

Figure 2:
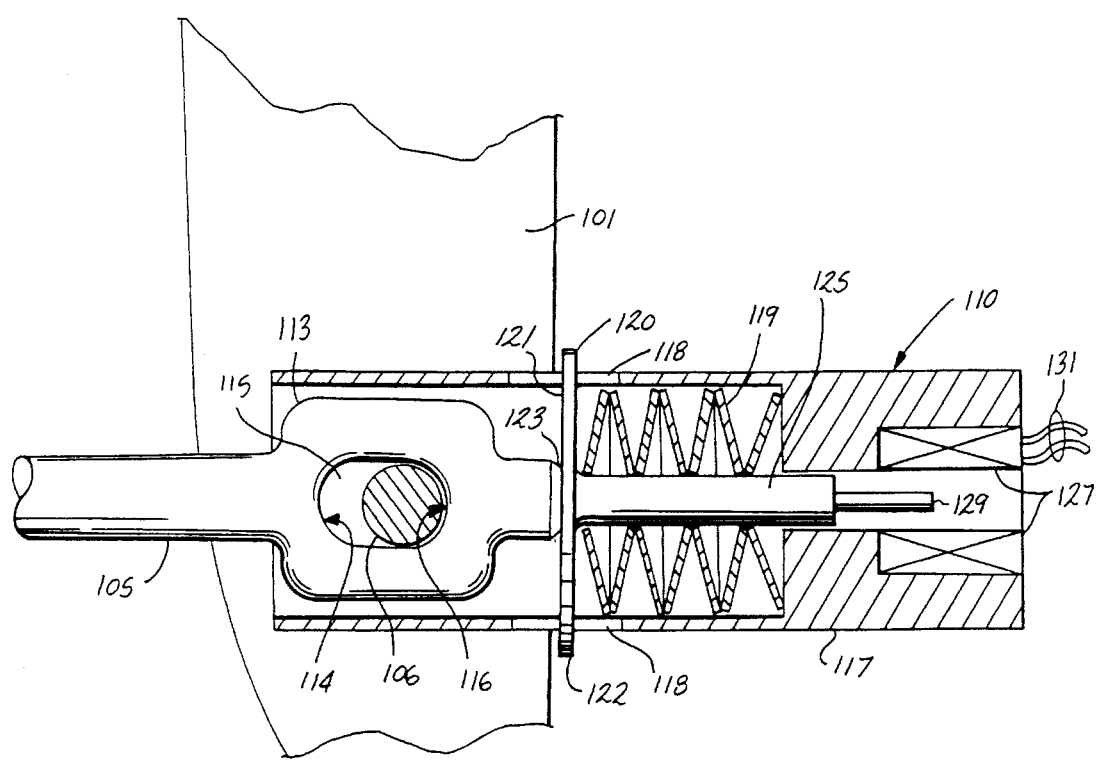
FIG. 2 is a partial cross-sectional representation of the sensing device of FIG. 1.

FIG. 2 is a cross-sectional representation of the sensor 110 and showing an enlarged detail of a portion of the push rod 105. As shown in FIG. 2, the push rod 105 is provided with an enlarged section 113 provided with a slotted opening 115 having opposite ends and extending around the pedal arm force pin 106. The sensor 110 is provided with a housing 117 which is mounted onto the pedal arm 101 by means of the pedal arm pin 106. The sensor 110 is further provided with a coned disk spring, commonly referred to as a Belleville spring. A spring of this design is preferred to provide a high load, small travel design for brake system applications. Other types of springs may be used as well. The spring 119 exerts force against a force plate 121 which abuts an end surface 123 of the push rod 105. Consequently, the push rod 105 tends to be forced to the position generally represented in FIG. 2 in which the one end 116 of the slotted opening 115, that is nearest the end surface 123, is forced toward the pedal arm pin 106. As the pedal arm 101 is pivoted toward the fire wall 107, in the direction shown by the arrow in FIG. 1, the force exerted on the push rod 105 by means of spring 119 is counteracted by a reaction force applied to the push rod 105 in the master cylinder 109. When the counteracting force exceeds the force of the spring 119, the push rod 105 will move relative to the pedal arm pin 106, causing the force plate 121 to be moved away from the pedal arm pin 106 and compressing the spring 119. The spring is compressed at a rate proportional to force applied to the pedal arm 101. The force plate 121 is provided with tabs 120, 122 and the housing 117 is provided with slots 118 which allow for the movement of the force plate 121.

Figure 7:
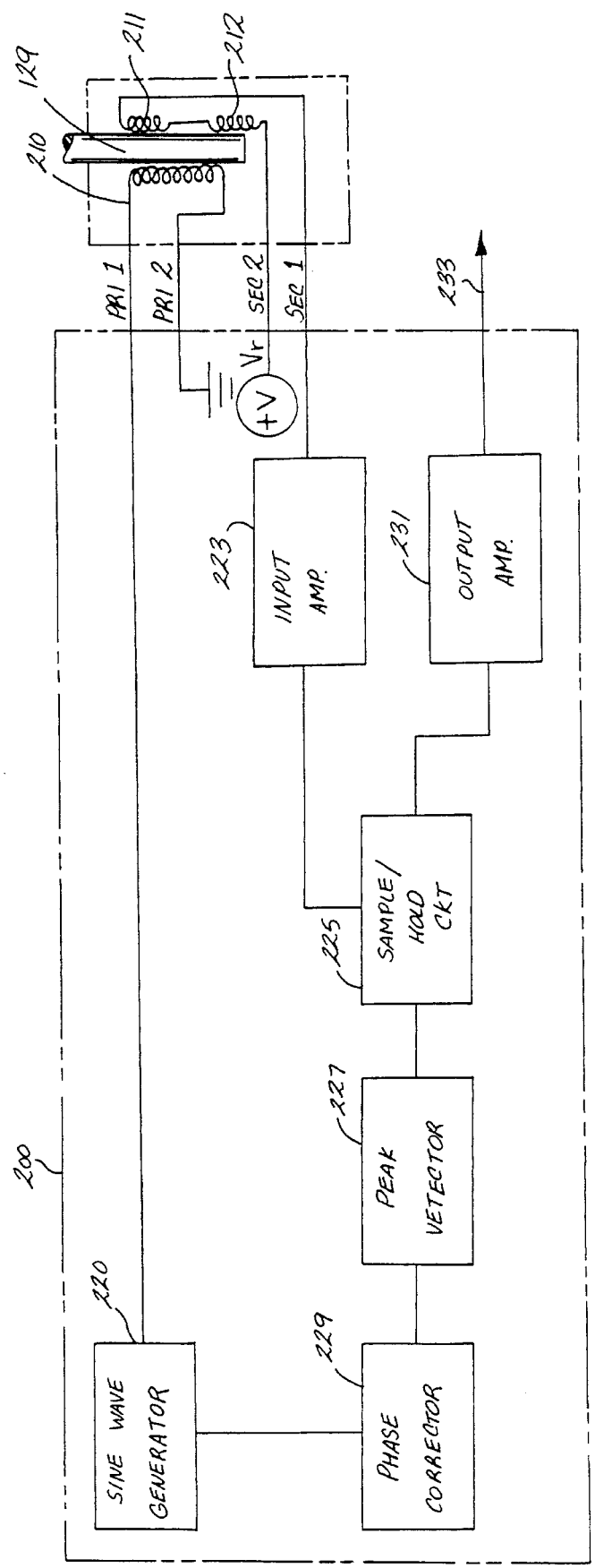
FIG. 7 is a block diagram representation of circuit elements of an electrical detection circuit connected to a transformer coil assembly.

The sensor 110 includes an electrical transformer coil assembly 127 consisting of a primary coil and a secondary coil shown schematically in FIG. 7. A transformer core section 129 is attached to a plunger pin 125 which extends through the spring 119 and attaches to the force plate 121. As the force plate is moved due to movement of the push rod 105 relative to the pedal arm pin 106, the core 129 moves in the field of the transformer 127 and causes a change in the characteristics of the transformer. A detector circuit, shown in FIG. 7, is connected to the transformer via conductors 131 and generates signals representative of the force applied, derived from the change in the characteristics of the transformer as a function of the relative position of the core 129 in the field of the transformer 127.

The transformer 127 may be a well-known and commercially available transformer known as a linear voltage differential transformer (LVDT). The force required to move the core a predetermined distance into the field of the transformer is a function of the characteristics of the spring. The spring may be linear or calibrated. In the case of a Belleville spring, the characteristics are typically expressed as a ratio of the height of the coned disk spring and the thickness of the spring sections. Tables and charts defining the relationship between deflection and force applied are well known and spring configurations having the desired characteristics may be readily obtained.

Figure 3:
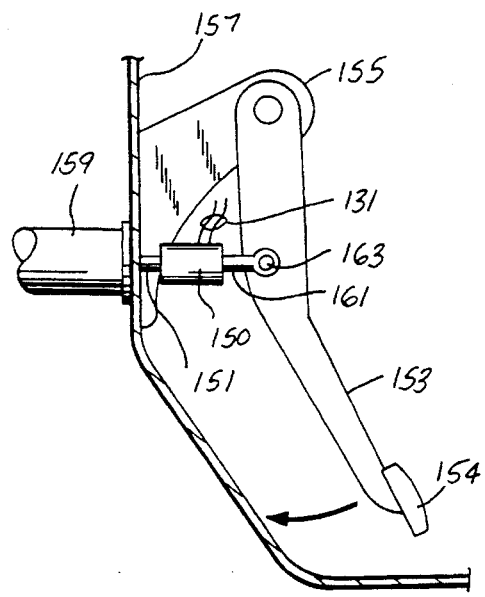
FIG. 3 is a diagrammatic representation of a brake pedal assembly and a force sensing device in another embodiment of the invention.

FIG. 3 is an alternate embodiment of the invention in which a sensor 150 is disposed between a push rod 151 and a pedal arm 153. The pedal arm 153 is pivotably supported on a mounting bracket 155 mounted on a fire wall 157 and extending to a master cylinder or the like 159. The sensor 150 is connected to the pedal arm 153 by means of an interconnecting rod 161 engaging a pedal arm pin 163.

Figure 4:
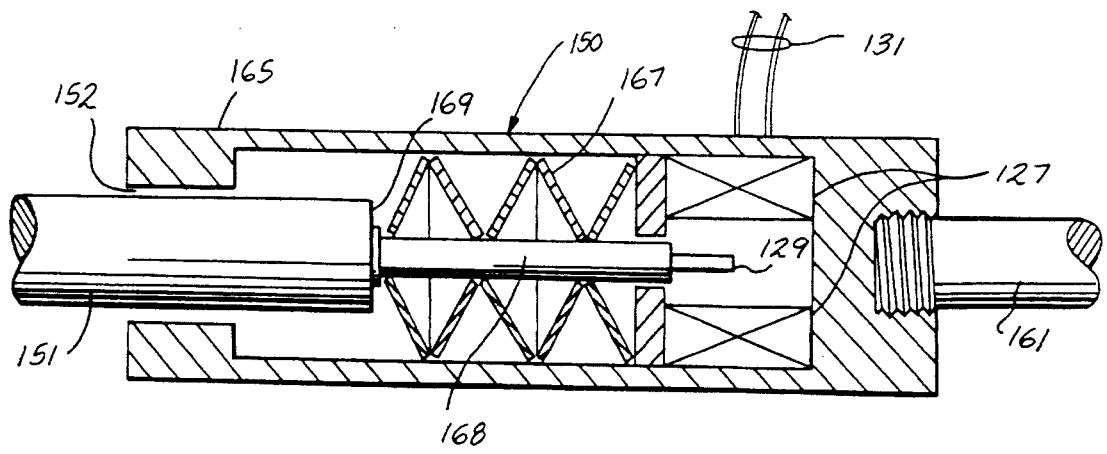
FIG. 4 is a partial cross-sectional representation of the sensing device of FIG. 3.

FIG. 4 is an enlarged cross-sectional schematic of the sensor 150. The sensor includes a housing 165 having one end connected to pedal arm 153 and provided with an opening 152 which extends over a portion of the push rod 151. A spring 167 within the housing 165 exerts a force on end surface 169 of the push rod 151.

Sensing transformer 127 contained within the housing 165 is shown in the form of an electrical schematic in FIG. 7 and is connected to detector circuit 200 via conductors 131. When the pedal arm 153 is pivoted in the direction of the fire wall 157, as indicated by the arrow in FIG. 3, by the application of a force to the foot plate 154, the spring 167 is compressed allowing movement of the push rod 151 into the sensor housing 165. This movement causes a plunger pin 168 having one end engaging to the end surface 169 of the push rod 151, to move in the direction of the transformer 127. A core 129, connected to the end of plunger pin 168 moves in a corresponding fashion in the field of transformer 129. In a manner discussed earlier with reference to FIGS. 1 and 2, the amount of travel of the core section 168 in the field of the transformer 127 is measured by detector circuit 200 which generates an electrical output signal representative of the displacement of the core and of the applied force. The output signal can be readily converted into data representative of the force applied by taking into consideration the force/deflection characteristics of the spring 167.

Figure 5:
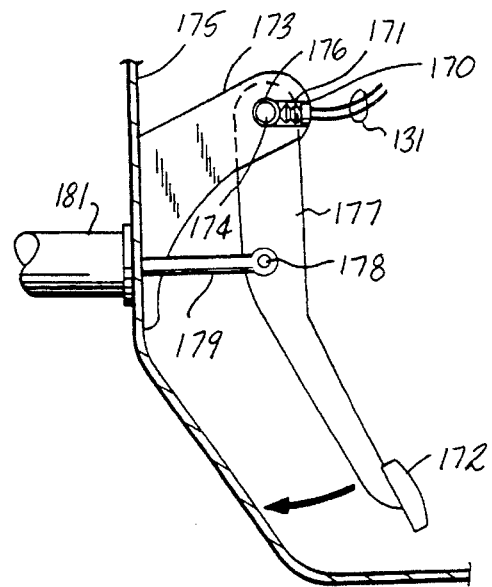
FIG. 5 is a diagrammatic representation of a brake pedal assembly incorporating another embodiment of the invention.
Figure 6:
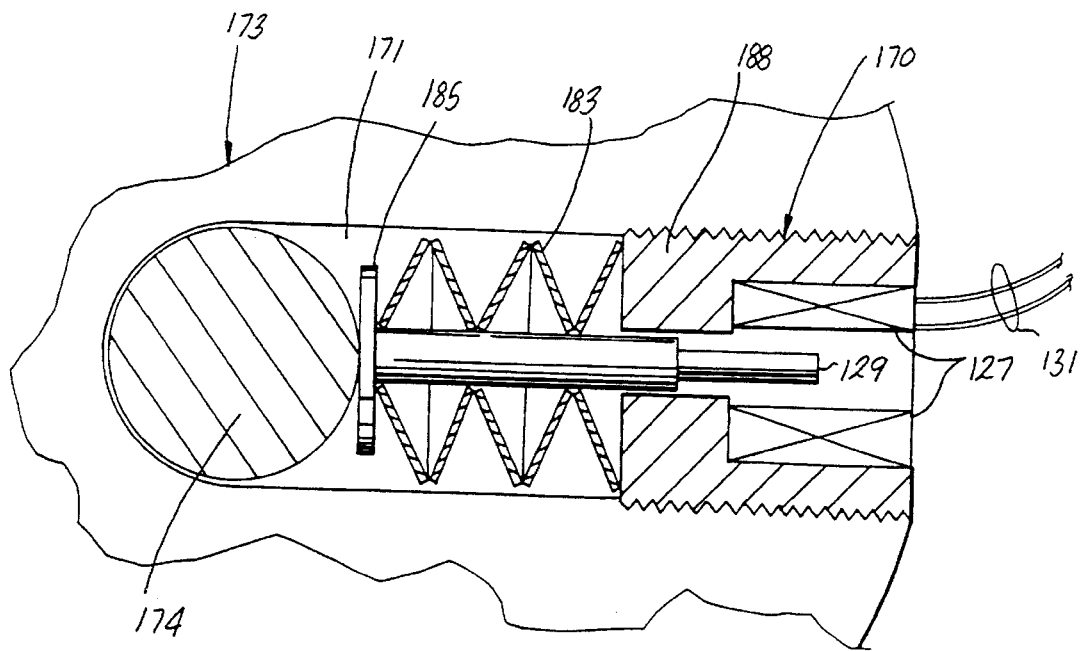
FIG. 6 is a partial cross-sectional representation of the embodiment of FIG. 5.

FIGS. 5 and 6 illustrate a further alternate embodiment of the invention. FIG. 5 shows a sensors 170 disposed within a slot 171 in support bracket 173 which is mounted on fire wall 175. A pedal arm 177 is hingedly supported on support bracket 173 by means of a pivot force pin 174 disposed in slot 171. A retainer 176 retains the pin in the slot. A push rod 179 is connected to pedal arm 177 and extends through the fire wall 175 into a master cylinder or the like 181.

FIG. 6 is a partial cross-sectional representation of the sensor 170 showing the pivot force pin 174 disposed within the slot 171. The sensor 170 includes a spring 183 which exerts a reaction force against a pressure plate 185 which, in turn, engages pivot pin 174. When a force is applied to the pedal arm 177, for example at the foot plate 172, a reaction force applied to the push rod 179 from the master cylinder 181 causes the pedal arm 177 to pivot about connecting pin 178, which connects the push rod 179 to pedal arm 177. This pivot action forces pivot pin 174 in the direction of the pressure plate 185 and causes spring 183 to be compressed as pin 174 moves within the slot 171. The sensor 170 is provided with a plunger pin 187 connected to the force plate 185 and provided with a core section 189. As the force exerted on the foot plate 172 increases, the force on pin 174 in the direction of the spring 183 is increased, causing the spring to be compressed further and causing movement of the core 189 into field of the transformer 127. This causes a change in the characteristics of the transformer 127 and a corresponding change in the output signal of detector circuit 200. In this manner, small changes in force on the foot plate 172, particularly at the beginning of travel when detection of change in force is most critical, is readily detected by means of the sensor 170. Once the pivot pin 174 has moved a predetermined distance, the spring 183 is essentially in maximum compression, and essentially all of the force applied to the foot pedal 172 will be transmitted to the push rod 179. The sensor 170 includes a housing unit 188 which is securely inserted in the slotted opening 171 by means of a screw thread as depicted in FIG. 6 or by other suitable means.

Figure 9A:
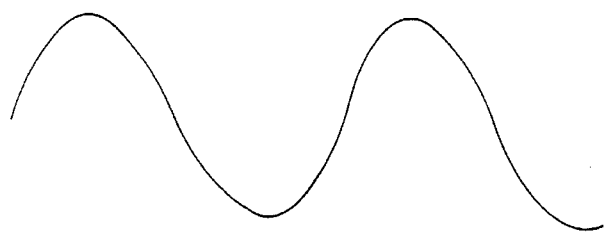
FIGS. 9a through 9f are representations of waveforms occurring in the circuitry of FIGS. 7 and 8.
Figure 9B:
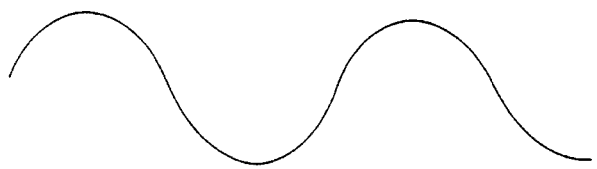
Figure 9C:
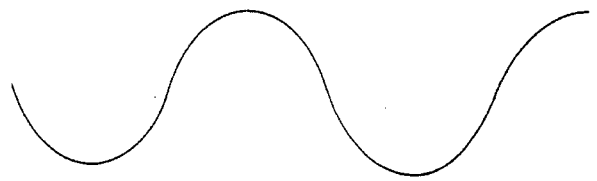

FIG. 7 includes a schematic representation of the linear voltage differential transformer 127 and a block diagram representation of electronic circuitry 200 connected to differential transformer 127. The transformer 127 comprises a primary coil winding 210 and first and second secondary windings 211 and 212. A sinusoidal wave, as shown in FIG. 9a, is generated by the sine wave generator 220 which is connected to one end of the primary coil 210 by a conductor PRI1. The other end of the primary coil is connected to ground via conductor PRI2. The secondary windings 211, 212 are constructed in such a manner that one of the windings, e.g., winding 211, generates a sine wave output and the other winding, e.g., winding 212, generates a cosine wave output. When the transformer core 129 is in a predetermined neutral position within the differential transformer, the sine and cosine signals generated by the two secondary windings cancel each other and the secondary current output is zero. When the core is displaced from the neutral position to one end position, the secondary output will be a sine wave of maximum amplitude, as represented in FIG. 9b. When the core is fully displaced in the opposite direction, the secondary output will be a cosine wave of maximum amplitude, as shown in FIG. 9c. In positions other than the neutral and extreme positions, the output signal from the secondary winding will be a sine wave or cosine wave of reduced amplitude.

Figure 9D:
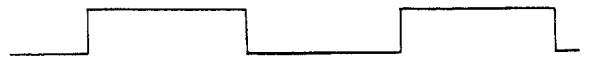
Figure 9E:
Figure 9F:
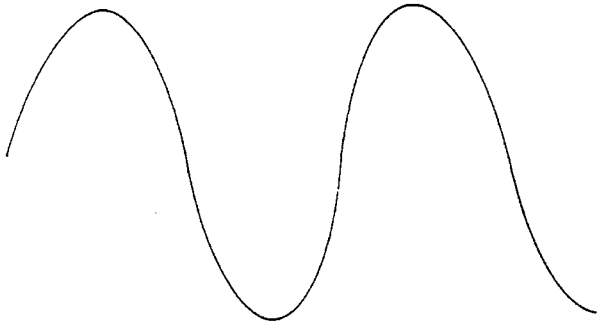

The secondary windings 211 and 212 are connected in series and a DC current is supplied from a voltage source Vr to one end of secondary coil 212. An input amplifier 223 is connected to one end of the secondary winding 211. This amplifier is provided to amplify the secondary output signal from the transformer 127 before it is applied to a sample and hold circuit 225, which operates in conjunction with a peak detector 227. The peak detector determines the peaks of the secondary output signal on the basis of an output of a phase corrector 229 and activates the sample and hold circuit at the peak of the secondary output signal. The phase corrector circuit 229 is connected to the sine wave generator 220 and provides the peak detector 227 with a sinusoidal waveform corresponding to the input waveform generated by the sine wave generator 220 but delayed by a predetermined delay period. The delay period corresponds to the delay introduced between the signal in the primary and the secondary windings of the transformer 127. This delay may be empirically determined and is a function of the characteristics of the transformer. FIG. 9d shows a phase shifted sinusoidal wave corresponding to the transformer primary input signal shown in FIG. 9a. The phase corrector circuit 229 provides a square wave output pulse represented in FIG. 9e, having a positive going transition at the positive peak of the sinusoidal wave of FIG. 9d and a negative going transition at the negative peak of the sinusoidal wave of FIG. 9d. The peak detector 227 responds to the square wave of FIG. 9e to generate a periodic sampling pulse, as shown in FIG. 9f.

The sample on hold circuit 225 applies the sampling pulse to the sinusoidal signal received from the transformer 127 and amplified by the input amplifier 223. An output signal indicative of the position of the core 129 within the transformer 127 is generated by the sample and hold circuit 225 and applied to an output amplifier 231 which generates an appropriate output signal indicative of the position of the core on output conductor 233. This output signal is a representation of applied force and may be analyzed further to determine the magnitude of the applied force on the basis of the force/deflection characteristics of the spring.

Figure 8:
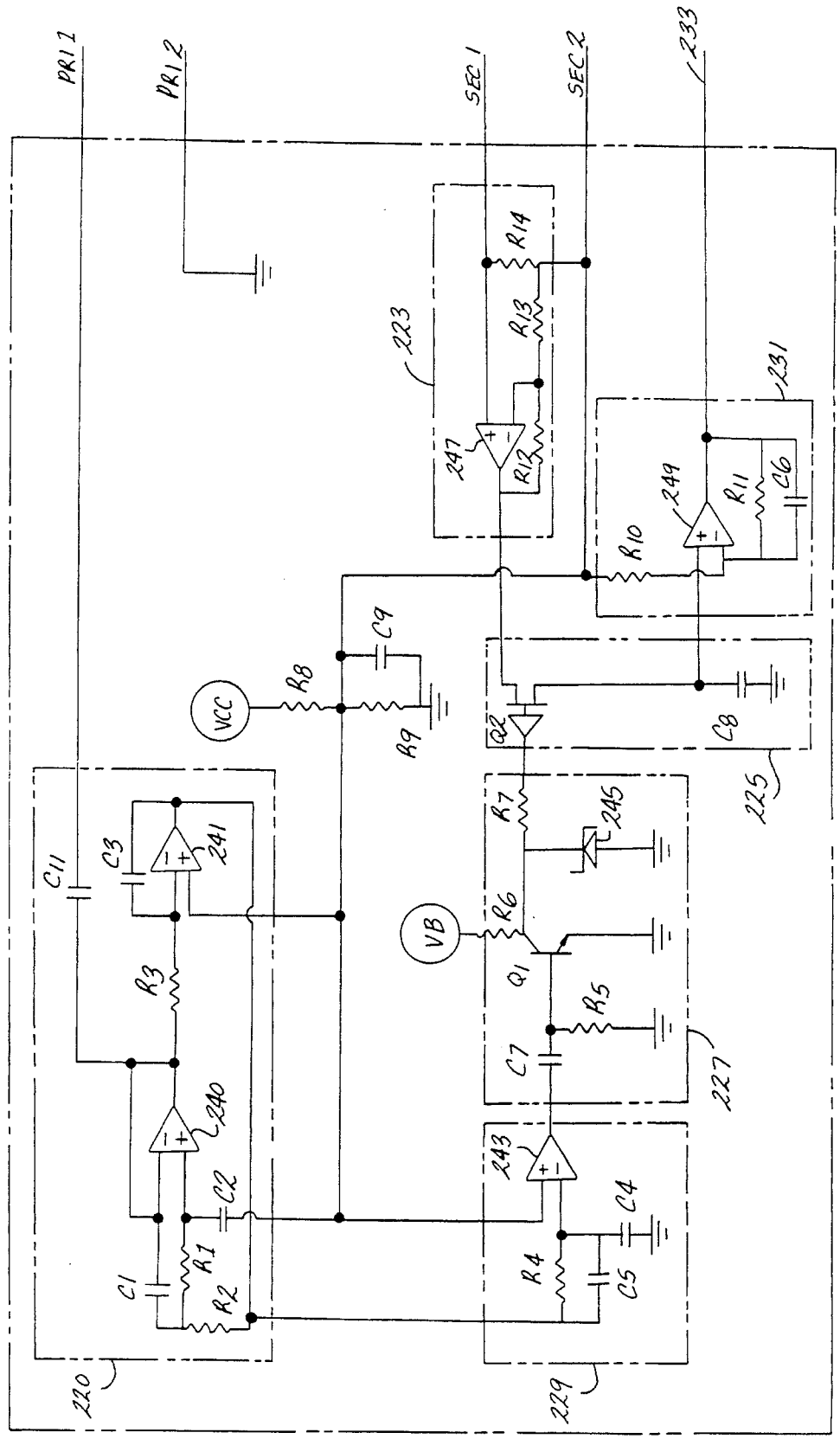
FIG. 8 is a more detailed circuit schematic of the electronic circuit of FIG. 7.

FIG. 8 shows circuit details of the circuit blocks of FIG. 7. The sinusoidal wave generator 220 comprises a pair of interconnected, well-known operational amplifiers 240 and 241. Each has a (+) and a (−) input terminal and an output terminal. The output terminal of operational amplifier 240 is connected through a resistor R3 to the (−) input terminal of operational amplifier 241. The output of the operational amplifier 241 is connected via a series resistors R1 and R2 to the (+) input terminal of operational amplifier 240 and via series connected resistor R2 and capacitor C1 to the (−) input terminal of amplifier 240. The output of operational amplifier 241 is connected to its (−) input terminal through a feedback capacitor C3. A reference voltage Vr is applied to the (+) input terminal of operational amplifier 241 and is connected through a capacitor C2 to the (+) terminal of operational amplifier 240. The sinusoidal waveform which is applied to the primary of transformer 127 via conductor PRI1 is taken from the output terminal of operational amplifier 240 via a blocking capacitor C11. The resistors R1, R2, and R3 control positive feedback to ensure oscillation and define the amplitude of the output signal. Capacitors C1, C2, and C3 control the desired frequency. Low-temperature coefficient resistors and capacitors are used to minimize frequency drift with changes in temperature. Exemplary values for the resistors and capacitors are given below in Table A.

The reference voltage Vr applied to operational amplifiers 240 and 241 may be derived from a standard source such as Vcc which is available as a source of power supply for the various circuits of the system. The voltage Vr is derived from Vcc through a voltage divider comprising resistors R7 and R8 and is approximately equal to 50% of Vcc. A capacitor C9 is provided to avoid transients.

The phase correction circuit 229 includes operational amplifier 243 which has a (+) input terminal connected to the reference voltage Vr and a (−) input terminal receiving a sinusoidal output signal from operational amplifier 241 through a phase shift network consisting of resistor R4 and capacitors C4 and C5. The output of operational amplifier 243 is a square wave, generally as shown in FIG. 9e, having a positive going transition when the positive amplitude of the phase shifted input signal of FIG. 9d reaches the reference voltage Vr. The square wave has a negative going transition when the negative amplitude of the input waveform of FIG. 9d reaches the reference voltage Vr. The output square wave of operational amplifier 243 is applied to the base of an NPN bipolar transistor Q1 through a capacitor C7. The base of transistor Q1 is connected to ground via resistor R5. The capacitor C7 and resistor R5 generate differential pulses which are applied to the base of transistor Q1. The collector of transistor Q1 is connected to a voltage source Vb through a load resistor R6. The output of transistor Q1 is applied resistor R7 to a p channel field effect transistor Q2 of the sample and hold circuit 225. A Zener diode 245 provides voltage protection to transistors Q1 and Q2.

The transistor Q2 operates as a switch which is turned on when the collector of transistor Q1 goes low. This occurs following the positive going leading edge of the square wave pulse generated by operational amplifier 243. When transistor Q2 is turned on, the signal occurring at the output of amplifier 223 causes the capacitor C8 to be charged or discharged, depending on the relative value of the signal and the charge on the capacitor C8. The value of the charge at the capacitor C8 is representative of the position of the core within the transformer for reasons described earlier, and the amplifier 231 amplifies the value of the signal and provides the output on output conductor 233. Input amplifier 223, which amplifies the input signal from the secondary coils on conductor SEC1 comprises a standard amplifier, such as shown in FIG. 8, consisting of an operational amplifier 247 and a standard feedback network consisting of resistors R12, R13, and R14. Similarly, output amplifier 231 comprises operational amplifier 249 with input transistor resistor R10 and a feedback network consisting of resistor R11 and capacitor C6. Amplifier 231 is preferably designed to provide low output impedance and high output current.

Exemplary values for the resistor and capacitor components in one illustrative embodiment of the circuit of FIG. 8 are shown in Table A below.

TABLE A

| R1 | 221K ohm | C1 | 470 picofarads |
|----|----------|----|----------------|
| R2 | 39.2K ohm | C2 | 47 picofarads |
| R3 | 10K ohm | C3 | 47 picofarads |
| R4 | 4.7K ohm | C4 | 100 picofarads |
| R5 | 10K ohm | C5 | 6.2 picofarads |
| R6 | 10K ohm | C6 | 27 picofarads |
| R7 | 100K ohm | C7 | 470 picofarads |
| R8 | 10K ohm | C8 | 27 picofarads |
| R9 | 10K ohm | C9 | 10 microfarads |
| R10 | 221K ohm | | |
| R12 | 221K ohm | | |
| R13 | 100K ohm | | |
| R14 | 100K ohm | | |

Each of a plurality of comparator circuits has an input terminal connected to output conductor 233 of the output amplifier 231 shown in FIG. 8. Furthermore, each of the comparators has an other input terminal connected to a voltage source of predetermined level. By means of the comparators, the input signal on conductor 233 is compared with the predetermined voltage level and an output signal is generated by the comparators on their respective output conductors only when the level of the input signal 233 exceeds the predetermined levels the corresponding one of the sources. By way of example, the level of one source may be selected to be comparatively low such that a comparatively low signal on conductor 233, generated by a slight application of force to a brake pedal, results in an output signal. This output signal may, for example, be used to release cruise control. Other output signals may be used for such other functions as transmission-lock release, shift interlock or to perform other functions which are preferably performed in response to different levels of force applied to the brake pedal. The comparator circuits may be any of a number of well-known comparators and the sources may be separately provided sources or derived from an other source such as Vcc of FIG. 8.

It is to be understood that the above-described arrangement is merely illustrative of the application of the principles of this invention; other arrangements may be devised by those skilled in the art without departing from the spirit and scope of the invention.

What is claimed is:

1. In combination, a force application lever having one end and a first force pin adjacent the one end of the lever and a free end and a second force pin disposed between the one end and the free end;

a support member pivotally supporting the lever and providing a first reactive force in a first direction to the first force pin and a push rod having an end surface, the push rod connected to the second force pin and providing a second reactive force in a second direction opposite the first direction to the second force pin when a force extending in the first direction is applied to the free end;

a housing attached to the second force pin;

a compressible spring disposed within the housing and connected to the second force pin and abutting the end surface of the push rod, the spring being compressed and transmitting a force to the push rod when a force is applied to the free end of the lever;

the push rod comprising a longitudinally extending slotted opening having opposite ends;

the second force pin being disposed within the slotted opening and engaging one end of the slotted opening to transmit force directly to the push rod when the spring has been compressed to a predetermined distance;

a transformer coil assembly;

a plunger pin having one end engaging the spring and a free end disposed adjacent the coil assembly;

a signal generator connected to the coil assembly and transmitting a sinusoidal output signal to the transformer coil assembly; and an output circuit connected to the signal generator and the coil assembly and generating an output signal indicative of applied force, in response to movement of the plunger pin relative to the coil assembly resulting from compression and expansion of the spring.

2. The combination in accordance with claim 1 wherein the compressible spring comprises a coned disk spring.

3. A brake system force actuator coupled to a vehicle brake system comprising:

a force application lever;

a movable brake actuator rod having one end engaging the brake system;

the force application lever pivotally supported at one end and comprising a free end and a force pin disposed between the one end and the free end;

a compressible spring disposed between the force pin and the brake actuator rod, the spring being compressed when a force is transmitted between the force application lever and the brake actuating rod;

a force application sensing device;

a plunger pin having one end engaging the spring and a free end disposed adjacent the sensing device; and an output circuit connected to the sensing device and generating an output signal indicative of applied force in response to movement of the plunger pin relative to the sensing device resulting from compression and expansion of the spring, whereby the output circuit provides the output signal indicative of force applied to the brake system independent of the distance of travel of the free end of the lever.

4. In combination, a force application lever having one end and a first force pin adjacent the one end of the lever and a free end and a second force pin disposed between the one end and the free end;

a lever support member pivotally supporting the lever and providing a first reactive force in a first direction to the first force pin;

a push rod connected to the second force pin and having an end surface, the push rod comprising a longitudinally extending slotted opening having opposite ends, the push rod providing a second reactive force in a second direction opposite the first direction to the second force pin when a force extending in the first direction is applied to the free end;

a spring retaining structure attached to the second force pin;

a compressible spring disposed within the spring retaining structure and connected to the second force pin and having one end abutting the end surface of the push rod, the spring being compressed and transmitting a force to the push rod when a force is applied to the free end of the lever;

the second force pin engaging one of the opposite ends of the slotted opening to transmit force directly to the push rod when the spring has been compressed a predetermined distance;

a transformer coil assembly;

a plunger pin having one end engaging the spring and a free end disposed adjacent the coil assembly;

a signal generator connected to the coil assembly and transmitting a sinusoidal output signal to the transformer coil assembly;

an output circuit connected to the signal generator and the coil assembly and generating an output signal indicative of applied force, in response to movement of the plunger pin relative to the coil assembly resulting from compression and expansion of the spring.

5. The combination in accordance with claim 4 wherein the spring retaining structure is pivotally connected to the second force pin.

6. The combination in accordance with claim 4 wherein the transformer coil assembly is disposed within the housing.

7. The combination in accordance with claim 5 wherein the transformer coil assembly is disposed within the housing.

8. The combination in accordance with claim 4 wherein the compressible spring comprises a coned disk spring.

9. The combination in accordance with claim 4 wherein the signal generator comprises an oscillator circuit having a first amplifier circuit having an output terminal connected to the transformer coil assembly and a first input terminal connected to the output terminal and a second input terminal, and second a amplifier circuit having an output terminal connected to one side of a first resistor and to one side of a first capacitor and having a first input terminal connected a voltage source and a second input terminal connected to another side of the first capacitor and to one side of a second resistor, the second resistor having another side connected to the output terminal of the first amplifier circuit, the first resistor having another side connected to one side of a third resistor and to one side of a second capacitor, the second capacitor having another side connected to the first input terminal of the first amplifier circuit, and the third resistor having another side connected to the second input terminal of the first amplifier circuit, and a third capacitor connected between the second input terminal of the first amplifier circuit and the voltage source.

10. In combination, a force application lever having one end and a first force pin adjacent the one end of the lever and a free end and a second force pin disposed between the one end and the free end;

a lever support member pivotally supporting the lever and comprising a slotted opening having opposite ends, said first force pin slidably supported in the slotted opening;

a push rod pivotally supported on the second force pin;

a compressible spring disposed within the slotted opening between the first force pin and one end of the slotted opening to exert a reactive force on the first force pin in a predetermined direction when a force is applied to the free end of the lever in the predetermined direction;

a transformer coil assembly;

a plunger pin having one end engaging the spring and a free end disposed adjacent the coil assembly;

a signal generator connected to the coil assembly and transmitting a sinusoidal output signal to the transformer coil assembly;

an output circuit connected to the signal generator and the coil assembly and generating an output signal indicative of applied force, in response to movement of the plunger pin relative to the coil assembly resulting from compression and expansion of the spring.

11. A brake system force application sensor coupled to a fluid-actuated vehicle brake system comprising:

a force application lever;

a movable brake actuator rod having one end engaging the fluid actuated brake system;

the force application lever pivotally supported at one end and comprising a free end and a force pin disposed between the one end and the free end;

a compressible spring disposed between the force application lever and the brake actuator rod, the spring being compressed when a first force is applied to the spring by the force application lever in a first direction and a second force is applied to the spring by the fluid actuated brake system via the brake actuating rod in a second direction opposite the first direction;

a force application sensing device;

a plunger pin having one end engaging the spring and a free end disposed adjacent the sensing device; and an output circuit connected to the sensing device and generating an output signal indicative of applied force in response to movement of the plunger pin relative to the sensing device resulting from compression and expansion of the spring.

12. The combination in accordance with claim 11 wherein the force application sensing device comprises a primary coil and a secondary coil and the secondary coil generates a sinusoidal output signal and wherein the output circuit comprises a peak detection circuit generating an output signal indicative of peaks of the sinusoidal output signal and a sampling circuit responsive to the peak detection circuit for sampling the sinusoidal output signal of the secondary coil and providing an output signal indicative of applied force.

13. The combination in accordance with claim 4 wherein the output circuit further comprises an input amplifier connected between the sampling circuit and the secondary coil and an output amplifier connected to the output of the sampling circuit.

14. The combination in accordance with claim 12 and further comprising at least one comparator circuit connected to the output circuit and to a signal source of predetermined signal level, the comparator circuit generating an output signal indicative of an applied force greater than a predetermined level of applied force when the level of the output signal generated by the output circuit exceeds the predetermined level of the signal source.

\* \* \* \* \*